July 11, 1933.  C. W. HEWLETT  1,918,102
FILM SOUND RECORD APPARATUS
Filed May 6, 1929
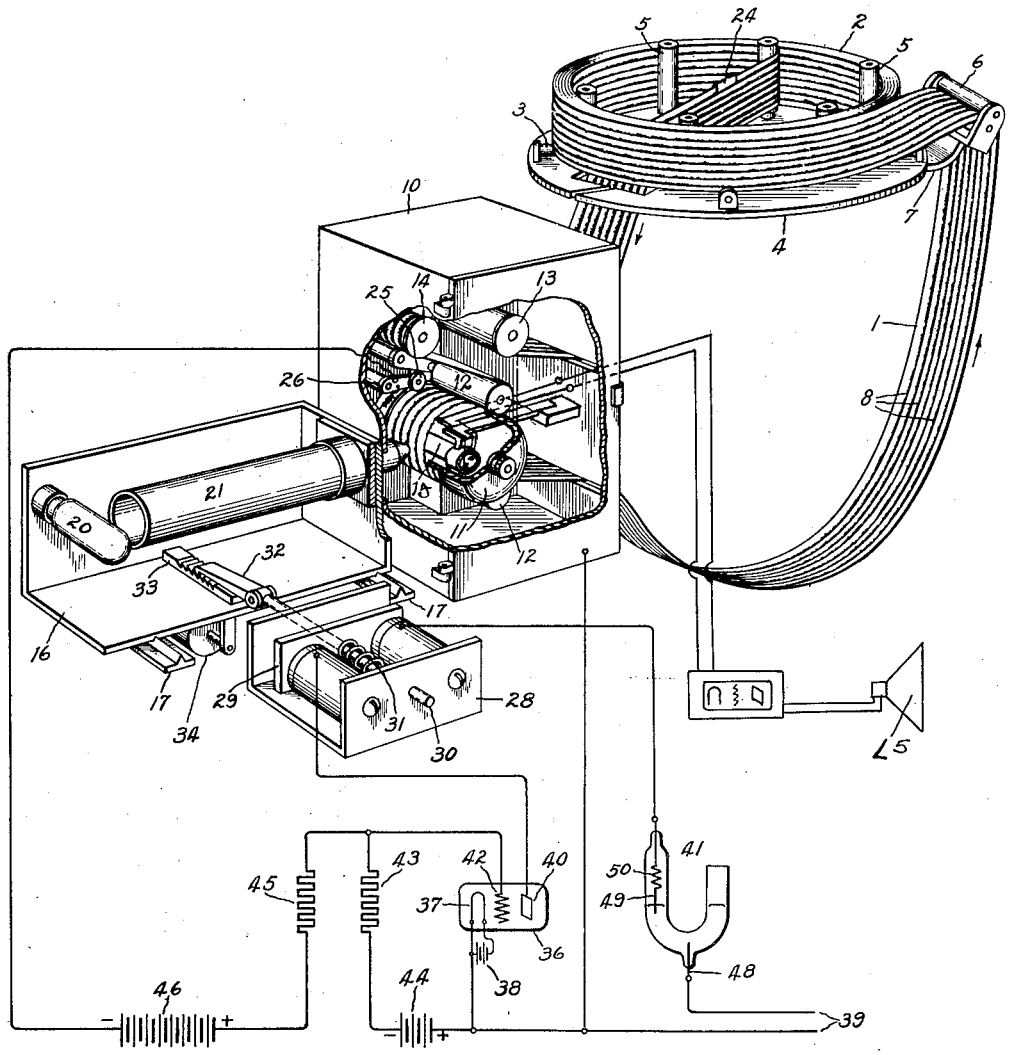
Inventor
Clarence W. Hewlett,
by Charles E. Tullar
His Attorney.

Patented July 11, 1933

1,918,102

UNITED STATES PATENT OFFICE

CLARENCE W. HEWLETT, OF SCHENECTADY, NEW YORK, ASSIGNOR TO GENERAL ELECTRIC COMPANY, A CORPORATION OF NEW YORK

FILM SOUND RECORD APPARATUS

Application filed May 6, 1929. Serial No. 360,974.

My invention relates to apparatus for recording sound on a film of the motion picture type and for reproducing sound from a record on such a film. An object of my invention is the provision of improved apparatus of this character whereby the sound record forms a plurality of separate parallel tracks on the film which are successively traversed and the transfer from one track to another is effected automatically under the control of the film.

My invention is applicable to either film sound recording apparatus or to film sound reproducing apparatus. I have chosen to illustrate it herein as forming a part of a reproducing apparatus the film being provided with a previously recorded sound record forming a plurality of tracks thereon.

My invention will be better understood from the following description taken in connection with the accompanying drawing, and its scope will be pointed out in the appended claims.

Referring to the drawing, the single figure of which illustrates one embodiment of my invention, the film 1 of the well known motion picture type having its two ends secured together to form a continuous or endless band, forms for the most part the coil 2 which is supported by the rollers 3 on the plate 4 and which extends over the guide rollers 5. Additional guide rollers are provided for the film where it leaves and enters the coil, the roller in the latter position being shown at 6 supported by the arm 7 on the plate 4. When the machine is in operation the film is withdrawn from the inside of the coil and winds up on the outside thereof. The particular film illustrated has the sound record formed in seven separate, parallel, spaced tracks 8 thereon which are traversed successively in the reproduction.

Adjacent the film coil is the housing 10 having a door at one side and having suitable openings in the rear through which the free loop of the film extends. Within the housing is the hollow driving drum 11 over which the film passes and against which the film is pressed by the two rubber faced rollers 12. The drum is cut away under all that portion of the film covered by the sound record tracks so that the film is supported on the drum only at its marginal portions as shown for example in British Patent 293,380. The drum is rotated at a uniform speed by suitable motor mechanism which is not shown and which forms no part of my present invention. Suitably supported from the rear is a photo-electric cell 15 which is positioned within the drum in a manner to receive light rays modified by the sound record from the optical system to be described later. The cell is connected through suitable amplifying devices to a loud speaker LS in the well understood manner. Between the upper roller 12 and the entrance opening in the casing the film passes successively over the idlers 13 and 14 of which the latter at least has end flanges to guide the film laterally on the drum.

At the side of the casing 10 opposite to that having the openings for the film I have shown the carriage 16 mounted to slide on the guides 17 in a direction parallel to the axis of the drum. On this carriage is mounted the optical system by means of which a very narrow light beam is focused on the film where it is supported by the drum. The optical system is shown as comprising the light source 20 having a suitable concentrated filament and the mounting tube 21 containing a light slit and a lens system by which a reduced image of the slit is focused on the film. The tube 21 extends beyond the carriage and into the casing through a slot therein which preferably is covered in a light-tight manner by the carriage.

The several sound tracks 8 on the film constitute a continuous record which transfers from one track to the next at each complete passage of the film. For shifting the optical system from one track to the next automatically under the control of the film and at the proper time I have provided the means which I shall now describe. On one edge of the film I attach the thin metal clip or tab 24. Within the casing 10 I mount the metal wheel 25 on the insulated pivoted arm 26 which is positioned and biased by a small spring so that the wheel engages that edge of the film to which the tab is attached. The wheel thus is held by the film out of contact with the drum but each time the tab passes under it the drum and wheel are electrically connected with each other closing the control circuit which presently will be described. For shifting the carriage I have provided the electromagnet 28 having the armature 29 secured to the rod 30 and yieldingly held in the outward position by the coil spring 31. Rod 30 which is shown guided by being passed through the magnet supporting frame has pivoted to one end thereof the pawl 32 arranged to engage the ratchet 33, the teeth of which are spaced an amount equal to the spacing of the sound tracks on the film. Each time the magnet is energized, the carriage and optical system carried thereby is shifted a distance of one tooth of the ratchet. To steady the movement of the carriage and to prevent its overshooting I provide the dashpot 34 of which the cylinder is shown fixed and the plunger attached to the carriage. For causing the energization of the electromagnet 28 in response to the electrical connection of the wheel 25 and drum 11 by the tab on the film I have provided a thermionic device called a thyratron and shown diagrammatically at 36. This device is similar to the well known pliotron in that it has a hot cathode, an anode and a grid mounted in an evacuated vessel. It differs, however, from a pliotron in certain features particularly in that the vessel contains a gas, or vapor, at a pressure such that there is an arc-like discharge between the anode and the cathode. Such a device is described in the General Electric Review, vol. 32, No. 4 in an article entitled, "Hot-cathode thyratrons", beginning on page 213. It is also disclosed and claimed in the copending application of Albert W. Hull, Serial No. 268,975, filed April 10, 1928 and assigned to the same assignee as the present application. On the drawing I have shown the thyratron 36 having its cathode 37 heated by current from the battery 38 and connected to a source of direct current supply 39, for example of 125 volts. The anode 40 connects with one terminal of the magnet winding and the opposite terminal connects through the thermal cut-out device 41 with the source 38. The grid 42 connects through resistance 43 with the battery 44 by which it is given a normal negative bias, for example of 4.5 volts. The grid also connects through the resistance 45 with the positive terminal of the battery 46, for example of 45 volts, the negative terminal of which is connected with the wheel 25 running on the film. Since the current flow through the thyratron and magnet 28 after having been started cannot be stopped by grid action, I have provided the thermal device 41 for opening the circuit. This device is shown comprising a U-tube partly filled with mercury and having one closed arm preferably filled with hydrogen. It has two terminals 48 and 49, the first sealed in the bottom of the tube and the other sealed in the closed arm. Terminal 49 normally dips into the mercury and is suspended by the heating coil 50.

In the operation of the apparatus the coil of film bearing the sound record to be reproduced will be placed in position on the supporting rollers and the free loop pushed sidewise into the openings therefor in the casing and over the rollers and drum. The point of the transfer of the sound record from one track to another should be just beyond the light beam in which position the tab 24 will be beyond the contact wheel 25. By lifting the pawl from the ratchet the carriage can be moved back to the point where the pawl engages the first ratchet tooth in which position the optical system will focus the light beam on the first sound track. The driving motor is then started passing the film at a uniform speed through the light beam. When the entire length of film has been passed and the point is reached at which the sound record transfers to the next sound track the tab passes under the contact wheel 25 closing the grid circuit of the thyratron. An arc-like discharge immediately is started in the thyratron and the carriage is shifted by the magnet 28 a distance of one tooth of the ratchet bringing the light beam into alinement with the next sound track. It will be understood of course that the tab is so located that the shift of the carriage takes place at exactly the proper time and in correspondence with the movement of the recording light when the record was made. In apparatus which I have constructed I have found that the time required to shift the carriage is about one tenth of a second which is hardly noticeable in the operation of this machine. A few seconds after the magnet circuit is closed, which by reason of the use of the thyratron continues to carry current, the thermal device 41 operates to open the circuit. Upon cooling of the thermal device it again closes the circuit preparatory to the next operation of the thyratron. The above described operation is repeated each time the tab passes through the machine, automatically shifting the light beam at the proper time from one sound track to the next until the entire record has been reproduced. I have found that a thyratron is particularly well adapted for this use. The tab 24 being secured to the film preferably is of very light construction and should not be required to carry a current larger than a few milliamperes. The thyratron requires for its control only a very minute grid current. Moreover because of its lack of inertia a tab of shorter length may be used than that required, if for example a relay were employed to control the magnet circuit.

I have already stated above that my invention is applicable either to record sound on a film or to reproduce from a film sound record. If it is employed for recording purposes it will be understood that the film will be completely enclosed in a light-tight casing, that the photo-electric cell is not used and that the light beam by which the film is exposed will vary in any suitable manner in accordance with the sound waves to be recorded. Certain features of my invention are applicable also to recording and reproducing apparatus using a film which is not endless in which case the sound record is transferred from one track to the next near each end of the film, a tab being used at each point of transfer to cause the shift at the proper time. In this case also the direction of rotation of the drum must be reversed at each shift. In such an arrangement it would be preferable since the film must be stopped and started again to employ a plurality of tabs at each end of the film located on both edges thereof; the first, for example, to cause the light beam to be extinguished, the next to reverse the motor and to shift the carriage and the last to relight the lamp.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. Film sound record apparatus comprising film driving means, optical means for directing a narrow light beam on a film driven thereby, a support for the optical means mounted for movement transversely of the film, electromagnetic means for shifting said support to each of a plurality of predetermined positions and contact means in circuit with said electromagnetic means adapted to be bridged by a conducting member on said film.

2. Film sound record apparatus comprising a film support, an endless film thereon, a member arranged to drive the film continuously in one direction, means for directing a narrow beam of light on the film, said film having a conducting tab thereon, contact means arranged simultaneously to engage said tab and electromagnetic means responsive to said engagement for causing relative movement between the film and the light means.

3. Film sound record apparatus comprising an endless film, a support therefor, a member arranged to drive the film continuously in one direction, optical means for directing a narrow beam of light on the film, electromagnetic means for shifting said optical means laterally of the film to each of a plurality of predetermined positions, an operating circuit for said electromagnetic means including contact members between which the film passes, and a conducting tab secured to the film whereby at each passage of the tab on the film the light beam automatically is shifted to a different position on the film.

4. Film sound record apparatus having electromagnetic operating means, a movable film, means directing a light beam on said film, a control circuit for said operating means including contacts arranged to engage the film, a thin conducting tab carried by the film and arranged momentarily to form a connection between said contacts, and a thermionic device having an evacuated envelope containing an anode, a cathode, an electrostatic control member and a charge of inert gas at a pressure sufficient to sustain an arc-like discharge, said anode and cathode being connected with said operating means and said control member being connected with said control circuit.

5. Film sound record apparatus comprising an endless film having a plurality of parallel sound record tracks thereon, a driving drum over which said film passes, optical means for directing a narrow light beam on the film supported on the drum, a photo-electric cell arranged to receive the light passing through the film, a carriage supporting said optical means and shiftable transversely of the film, an electromagnet for shifting the carriage, a thermionic device having an evacuated envelope containing an anode, a cathode, a grid and a charge of inert gas at a pressure sufficient to sustain .n arc-like discharge, said anode and cathode being connected in circuit with said electromagnet, a thermal cut-out device also in circuit with said electromagnet, a metal tab carried by the film and contact means arranged to engage the tab on the film for applying a predetermined positive charge to said grid.

In witness whereof I have hereunto set my hand this 4th day of May 1929.

CLARENCE W. HEWLETT.